UNITED STATES PATENT OFFICE.

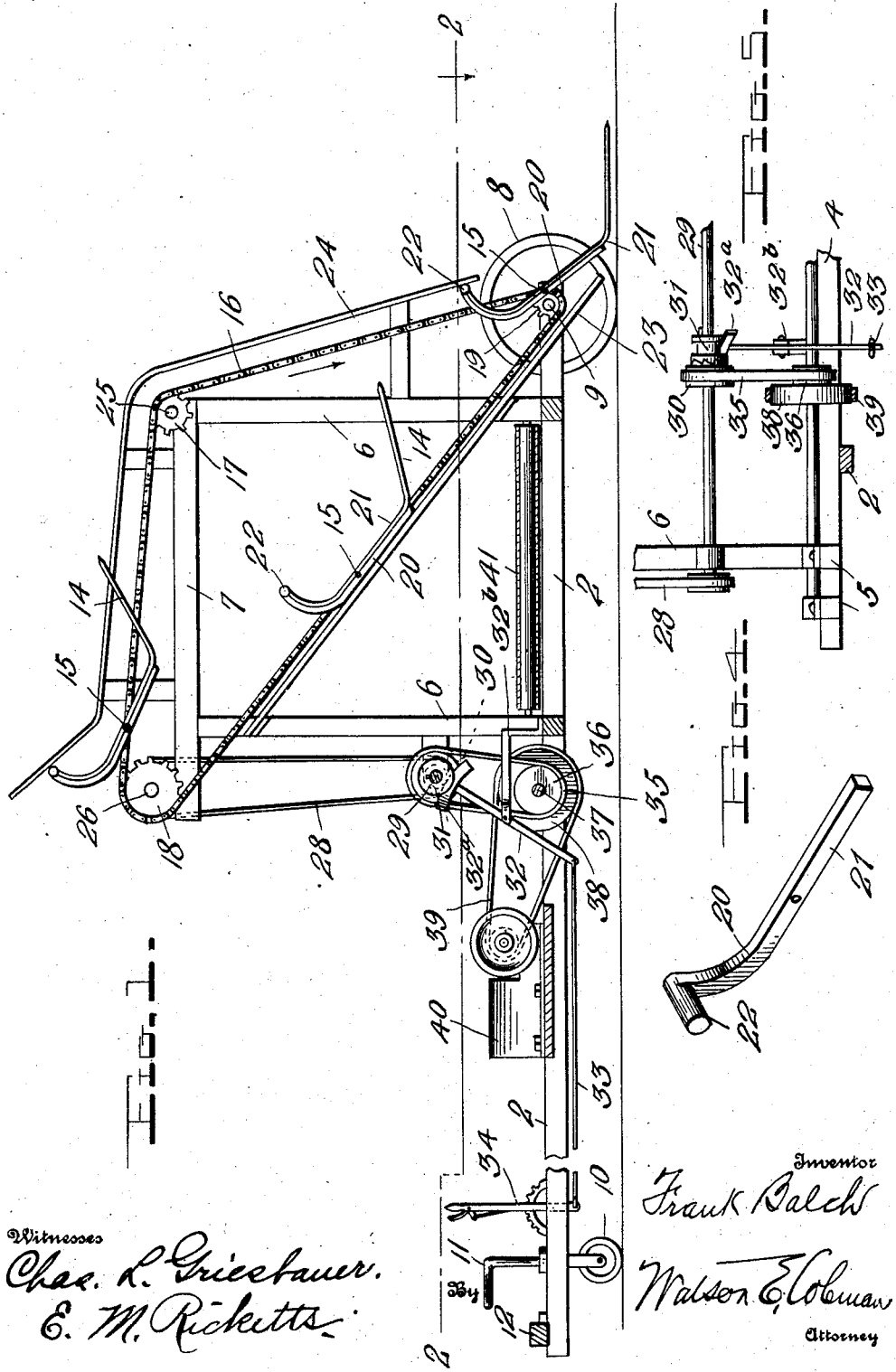

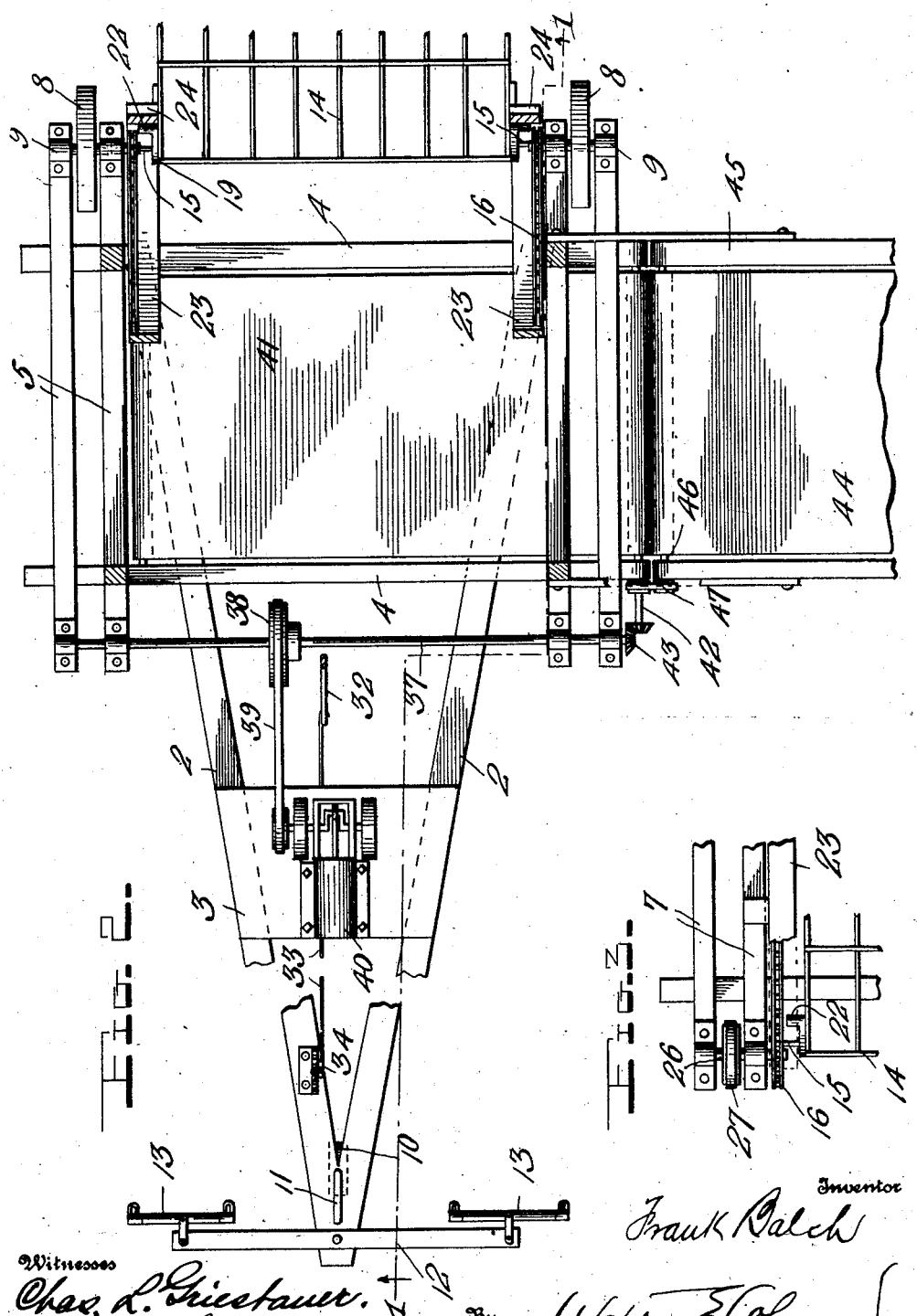

FRANK BALCH, OF CLEVELAND, NORTH DAKOTA.

SHOCK-LOADER.

974,014.  Specification of Letters Patent.  Patented Oct. 25, 1910.

Application filed October 16, 1909. Serial No. 523,038.

*To all whom it may concern:*

Be it known that I, FRANK BALCH, a citizen of the United States, residing at Cleveland, in the county of Stutsman and State of North Dakota, have invented certain new and useful Improvements in Shock-Loaders, of which the following is a specification, reference being had to the accompanying drawings.

This invention relates to improvements in shock or bundle loaders.

The object of the invention is to provide a simple and practical machine of this character which may be pushed by draft animals or otherwise propelled through a field and which will pick up bundles of grain, shocks, etc., and load them onto a wagon which moves alongside of the machine.

With the above and other objects in view, the invention consists of the novel features of construction and the combination and arrangement of parts hereinafter fully described and claimed, and illustrated in the accompanying drawings, in which—

Figure 1 is a vertical front to rear sectional view through the improved shock loader, the plane of the section being indicated by the broken line 1—1 in Fig. 2; Fig. 2 is a horizontal section taken on the plane indicated by the line 2—2 in Fig. 1; Fig. 3 is a detail plan view of one of the upper rear corners of the frame with a part of the upper track broken away; Fig. 4 is a detail view of one of the guide arms 20; and Fig. 5 is a detail view of the clutch 31.

In the drawings 1 denotes a main frame having a rear section consisting of two rearwardly converging side beams 2 united at their rear ends and connected intermediate their ends by a platform 3; and it also consists of a front section consisting of connecting beams 4 united to the diverging forward ends of the beams 2 and having their ends united by pairs by parallel side beams 5. Rising from the forward portion of the main frame is an upright frame consisting of uprights 6 united by upper side bars 7.

The front end of the frame is supported by two ground wheels 8 arranged on transverse axles 9 mounted in bearings on the forward portions of the side beams or bars 5 and the rear end of the frame is supported by a caster wheel 10 the upright pivot of which is provided with a suitable handle 11. Provided at said rear end of the main frame is a doubletree 12 or any other suitable draft bar to which latter are connected draft trees 13 so that animals hitched to the latter may push the machine forwardly. If desired, however, the machine may be propelled by a motor.

The shocks or bundles of grain or the like are adapted to be picked up by a plurality of basket-like forks 14 pivotally connected, as indicated at 15, to an endless carrier consisting of two sprocket chains 16 arranged to travel around sprocket wheels 17, 18, 19 arranged in triangular relation, as shown in Fig. 1. Each of the forks 14 consists of a plurality of angular tines arranged in parallel relation and united by suitable cross bars. To the endmost tine of each fork is suitably secured a combined reinforcing and guide arm 20 having a straight portion 21 and a curved portion terminating in a lateral lug or projection 22. The portions 21, 22 are adapted to respectively and successively engage lower and upper tracks 23, 24 arranged upon the upright forward portion of the main frame. The lower tracks 23 are secured to the uprights 6 and have straight forward portions and curved rear portions. The upper tracks 24 are supported from the uprights 6 and beams 7 and have angular forward portions and upwardly and rearwardly inclined rear portions. Said lower tracks 23 support the guide arms of the fork as the latter is elevated by the chains 16, and when said guide arms drop off of the tracks 23 the fork will tilt downwardly and forwardly to drop the bundle which it carries. The inclined or cam-shaped upper ends of the tracks 24 are engaged by the ends 22 of the guide arms and serve to return the fork to its normal position in which it is maintained by the remaining portions of the tracks 24 as the fork is lowered. In this connection it may be noted that while only three of the forks have been shown in the drawings, a greater or less number of them may be employed. The sprocket wheels 17 are for the purpose of guiding the chain 16 and are loosely mounted on stub shafts 25 and the sprocket wheels 19 are provided for a similar purpose and loosely mounted on the axles 9. The sprocket wheels 18 are the driving sprockets and are fixed to short transverse shafts 26 journaled in bearings on the rear ends of the beams 7, as shown more clearly in Fig. 3. On the shafts 26 are provided pulleys 27 connected by belts 28 to pulleys on a transverse shaft 29 journaled in suitable bearings on the uprights 6. On the intermediate portion of the shaft 29 is loosely mounted a pulley 30 adapted to be locked to said shaft for rotation therewith by any well known suitable clutch 31 controlled by a lever 32 which is connected by a link 33 to a hand lever 34 mounted on the rear portion of the main frame. The lever 34 has the usual locking means, as shown in Fig. 1. The clutch 31 consists of a circumferentially grooved sleeve slidably but non-rotatably arranged on the shaft 29 and having a ratchet clutch surface which engages a similar ratchet clutch surface on one side of the pulley 30, as indicated in Fig. 5, the groove in said sleeve being adapted to receive a diagonally disposed cam head 32$^a$ on one end of the lever 32, which latter is fulcrumed intermediate its ends on a bracket 32$^b$, as shown in Fig. 1. The pulley 30 is connected by a belt 35 to a pulley 36 fixed to a second transverse shaft 37 journaled in bearings on the rear ends of the beams 5. On said shaft 37 is a second pulley 38 connected by a belt 39 to the shaft of a gasolene engine 40 or any other motor mounted on the platform 3. By reason of the driving connection or gearing just described, it will be seen that the motion of the engine may be imparted to the elevator 16 for the purpose of operating the forks 14.

The bundles picked up by the forks drop from the same after they have reached their elevated position onto a laterally moving endless conveyer apron 41, the driving shaft 42 of which is connected by beveled gears 43 to the shaft 37, as shown in Fig. 2. The conveyer apron 41 discharges the shocks or bundles onto a similar upwardly and outwardly inclined discharge elevator 44 mounted in a frame 45 which is suitably connected to the main frame of the machine. The drive shaft 46 of the elevator apron 44 is connected by a drive belt 47 or any other suitable driving means to the shaft 42 so that the motion of the conveyer 41 will be imparted to the elevator 44.

In operation, the draft animals hitched to the rear of the machine push it forwardly and when the lowermost fork 14 is in the position shown in Fig. 1 and picks up a shock or bundle the operator starts the engine so that the chain 16 will travel in the direction indicated by the arrow in Fig. 1. When the engine or motor is thus started the straight portion 21 of the guide arm 20 of the fork which picks up the shock or bundle will engage the lower straight portion of the track 23 and in so doing will tip the outer ends of the tines of the fork upwardly to retain the bundle upon the fork. At the same time the fork will be carried upwardly and when the arm 20 leaves the upper end of the track 23 such fork will swing upon its pivot 15 and drop the shock or bundle onto the conveyer 41, which latter will in turn discharge it onto the elevator 44. A wagon is driven alongside of the machine beneath the upper end of the elevator to receive the bundles. The continued movement of the chain carries the fork around the sprocket wheels 18 until the projections 22 on the ends of the guide arms 20 engage the upwardly inclined rear ends of the upper tracks 24, which latter act as cams to return the fork to its normal or operative position.

From the foregoing it will be seen that the invention provides an effective machine of this character which will gather from the field and load upon a wagon shocks, bundles of grain and the like, thus dispensing with the necessity of manually gathering the same and pitching them into a wagon.

While I have shown and described in detail the preferred embodiment of my invention, it will be understood that I do not limit myself to the precise construction set forth since various changes in the form, proportion and details of construction may be resorted to within the spirit and scope of the invention.

Having thus described the invention what is claimed is:

1. In a machine of the character described, the combination of a portable frame, an endless carrier, forks pivotally mounted on the carrier, straight, upwardly and rearwardly inclined tracks in the frame, angular tracks arranged on the frame above said straight tracks and having substantially horizontal intermediate portions, substantially vertical front portions and upwardly and rearwardly inclined rear cam portions, means carried by the forks to engage said straight tracks as the forks are elevated, whereby they will be prevented from tilting from normal position until said means disengages said straight tracks, and means carried by said forks for engaging the second mentioned angular tracks, whereby the forks will be returned to normal position after they have dumped their contents and will be maintained in substantially normal position while being lowered.

2. In a machine of the character described, the combination of a portable frame, an endless carrier, forks pivotally mounted on the carrier, guide arms arranged on opposite sides of the forks adjacent their pivots and having straight portions and curved portions, the latter being provided with projections, tracks to receive the straight portions of said guide arms and support the forks against pivotal movement as they are elevated, and cam tracks to be engaged by said projections on the curved ends of the guide arms, whereby the forks will be returned to normal position and maintained in such position as they are lowered.

3. In a machine of the character described, the combination of a portable frame, an endless carrier, forks pivotally mounted on the carrier, guide arms arranged on opposite sides of the forks adjacent their pivots and having straight portions and curved portions, the latter being provided with projections, tracks to receive the straight portions of said guide arms and support the forks against pivotal movement as they are elevated, cam tracks to be engaged by said projections on the curved ends of the guide arms, whereby the forks will be returned to normal position and retained in such position as they are lowered, and an endless conveyer arranged beneath the first mentioned tracks to receive the bundles and shocks discharged from said forks.

4. In a machine of the character described, the combination of a portable frame, an endless carrier, forks pivotally mounted on the carrier, guide arms arranged on opposite sides of the forks adjacent their pivots and having straight portions and curved portions, the latter being provided with projections, tracks to receive the straight portions of said guide arms and support the forks against pivotal movement as they are elevated, cam tracks to be engaged by said projections on the curved ends of the guide arms, whereby the forks will be returned to normal position and retained in such position as they are lowered, a transversely moving endless conveyer arranged beneath the first mentioned tracks to receive the bundles and shocks dropped by the forks, a laterally extending endless elevator to receive the shocks and bundles from said conveyer, and means for actuating the carrier, the conveyer and the elevator.

5. In a machine of the character described, the combination of a portable frame having an open upright portion, an endless elevator consisting of chains united by pivotally mounted forks, the latter having at their ends guide arms provided with straight portions and curved portions terminating in outwardly extending projections, sprocket wheels arranged in triangular relation adjacent the opposite sides of the frame for supporting and guiding the chains of the carrier, straight tracks arranged in the frame and inclined upwardly and rearwardly, said tracks being adapted to be engaged by the straight portions of the arms on the forks, whereby the latter will be supported as they are elevated, irregular shaped cam tracks mounted on top of the frame and adapted to be engaged by the projections on the curved ends of the guide arms of the forks, whereby said forks will be returned to normal position and retained in such position as they are lowered, a transverse endless conveyer arranged in the lower portion of the upright part of the frame and adapted to receive the shocks or bundles discharged by the forks, and means for actuating said conveyer and carrier.

6. In a machine of the character described, the combination of a portable frame, an endless carrier, forks pivotally mounted on the carrier, straight, upwardly and rearwardly inclined tracks in the frame, angular tracks arranged on the frame above said straight tracks and having substantially horizontal intermediate portions, substantially vertical front portions and upwardly and rearwardly inclined rear cam portions, means carried by the forks to engage said straight tracks as the forks are elevated, whereby they will be prevented from tilting from normal position until said means disengages said straight tracks, means carried by said forks for engaging the second mentioned angular tracks, whereby the forks will be returned to normal position after they have dumped their contents and will be maintained in substantially normal position while being lowered, a lateral conveyer in the lower part of the frame to receive the bundles and shocks from the forks, and means for actuating said conveyer and carrier.

7. In a machine of the character described, the combination of a portable frame, an endless carrier consisting of sprocket chains united by pivotally mounted forks, sets of sprocket wheels arranged in the frame and each set consisting of three wheels arranged in triangular relation, whereby the chains will be supported, guided and driven, straight, upwardly and rearwardly inclined tracks in the intermediate portion of the frame, irregular cam-shaped tracks on the upper portion of the frame above the straight tracks, means carried by the forks to engage said straight tracks, whereby the forks will be supported in normal position until they are elevated, means carried by said forks to engage said cam tracks, whereby the forks will be returned to normal position and retained in such position as they are lowered, means in the lower portion of the frame to receive the bundles or shocks dropped by the forks, and a motor carried by the frame for driving said carrier.

In testimony whereof I hereunto affix my signature in the presence of two witnesses.

FRANK BALCH.

Witnesses:
 DRURY BAKER,
 DAISY A. BALCH.